Figure 1:
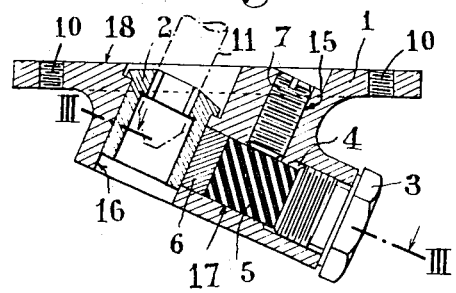

Dec. 12, 1967  A. BRUEDER  3,357,041
BRAKING DEVICE FOR HOLDING A PIVOT PIN AGAINST MOTION
Filed Oct. 6, 1964  2 Sheets-Sheet 1

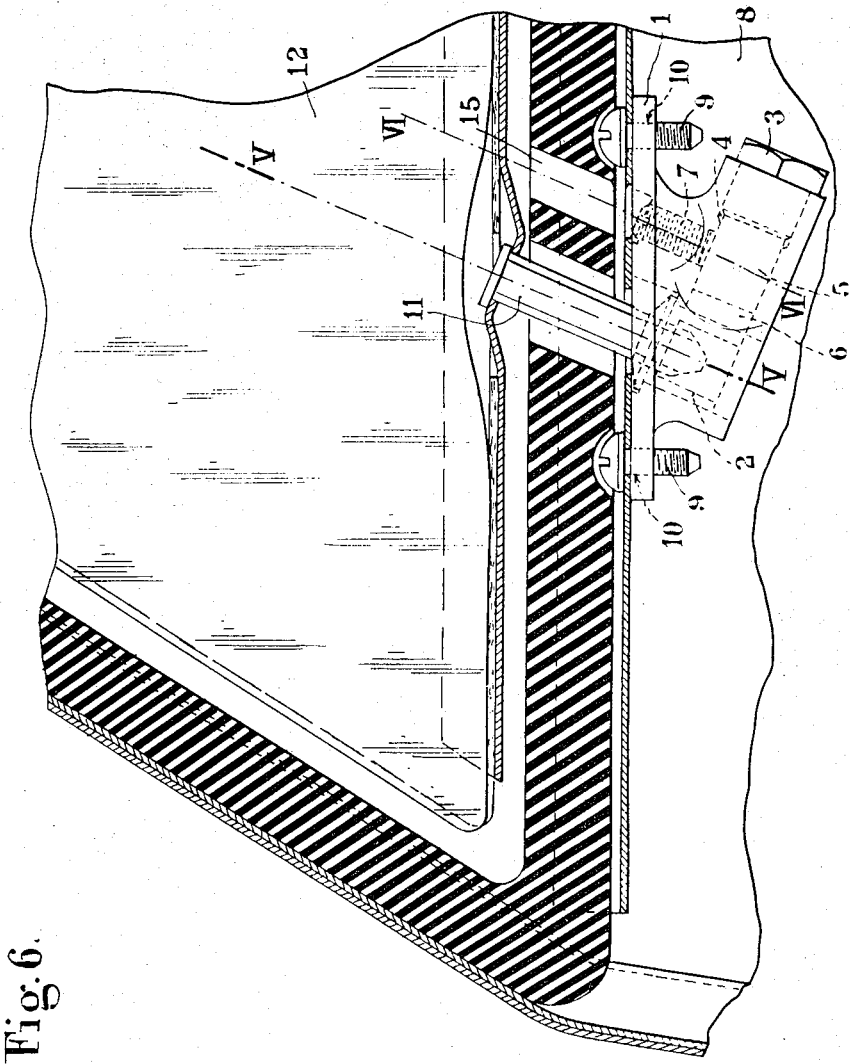
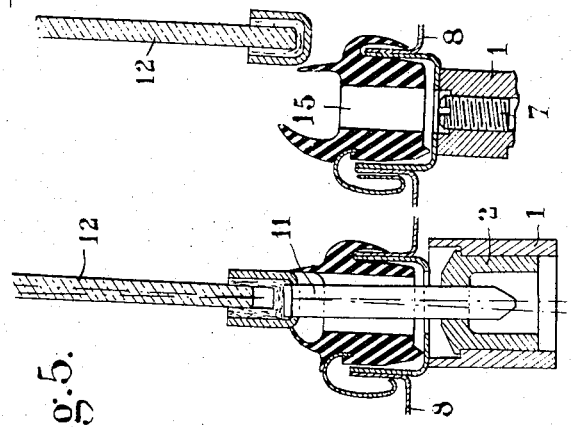

ized Patent Office 3,357,041
Patented Dec. 12, 1967

3,357,041
BRAKING DEVICE FOR HOLDING A PIVOT PIN AGAINST MOTION
Antoine Brueder, Paris, France, assignor to Societe Anonyme Andre Citroen, Paris, France
Filed Oct. 6, 1964, Ser. No. 401,837
Claims priority, application France, Oct. 9, 1963, 950,061, Patent 1,380,580
4 Claims. (Cl. 16—168)

This invention relates in general to means for braking a pivot pin and holding same against rotation and has specific reference to an improved device of this character.

In many devices permitting the adjustment of an apparatus in the desired angular setting braking means are used for holding against motion a pivot pin solid with the apparatus, these braking means utilizing the action of a metallic or non-metallic spring of which the tension is adjusted, if desired, through suitable means.

This invention is concerned more particularly with the use as a spring means of materials adapted to undergo an elastic deformation while being moderately compressible, for example rubber-type elastomers.

As a rule, devices of this character comprise a cavity in which the resilient pad is inserted; this pad engages with one face the pivot pin braking member or a presser ring or segment, and is tightly kept within its cavity by a plug or like member closing same.

This plug or like closing member is adapted in general to permit the adjustment of the pressure exerted by the device, that is, the braking force. This adjustment action is not always feasible or convenient, especially when the device is to be mounted in a concealed or scarcely accessible location.

This invention is concerned with a device for holding a pivot pin against motion in its supporting member, this device being characterized in that said supporting member is formed with a recess leading to an exposed surface, said recess receiving a member of which the adjustable penetration modifies the frictional contact with said pivot pin of an elastic pad inserted in a bore of said supporting member which communicates with said recess.

This braking element may contact the pivot pin either directly or through the medium of a pivot-pin supporting member rotatably driven with said pivot pin due to the provision of a non-circular engagement surface between said member and said pivot pin.

The adjustable penetration of said elastic-pad compression member permits of adjusting the frictional engagement produced between said braking member and said pivot pin.

Figure 2:
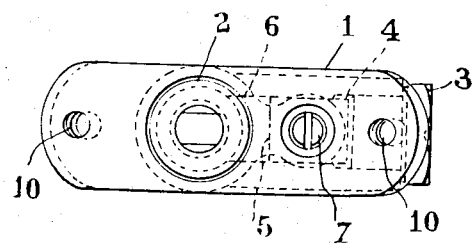
Figure 3:
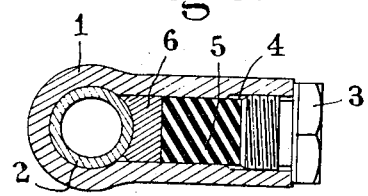
Figure 7:
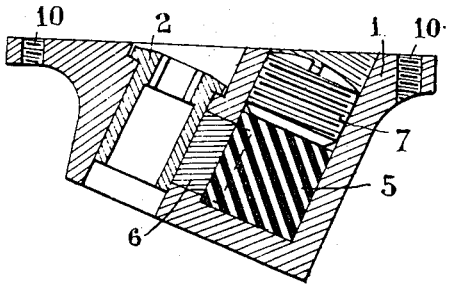

In order to afford a clearer understanding of this invention and of the manner in which the same may be carried out in practice, reference will be made to the accompanying drawings illustrating diagrammatically by way of example a device for braking the pivot pin of a flap to be mounted on a furniture or automobile body element, such as a hinged panel or frame of a door, window or non-draught ventilator. In the drawings:

FIGURE 1 is a cross-sectional view, and
FIGURE 2 is a plan view from above, of the device;
FIGURE 3 is a section taken upon the line III—III of FIGURE 1;
FIGURE 4 is a part-sectional view showing the mounting of the device receiving the mounting pivot pin of a non-draught ventilator;
FIGURE 5 is a section taken upon the line V—V of FIGURE 4;
FIGURE 6 is a section taken upon the line VI—VI of FIGURE 4.
FIGURE 7 is a cross sectional view showing another embodiment.

In the body 1 of the member adapted to receive the pivot pin 11 a pair of perpendicular cavities 16, 17 are formed; one cavity 16 is smooth and adapted to receive the socket 2 and the other cavity 17 is tapped at 4 and adapted to be engaged by a screw-threaded plug 3 to compress an elastomeric pad 5 action through the medium of a friction member 6 upon the socket 2 to hold same against rotation.

Parallel to said cavity 16 the body 1 has formed therein another cavity 15 adapted to receive an adjustment screw 7 whereby, by using a simple screwdriver, the compression of the elastic pad 5 and therefore the braking force applied to the socket 2 may be varied at will.

This device may be mounted for example on the door frame 8 of a vehicle by means of a pair of screws 9 engaging tapped holes 10 formed in the base plate or flange 18 of member 1, the pivot pin 11 of a non-draught deflector 12 for vehicle window being slidably engaged in the socket 2 while being rotatably solid therewith due to the non-circular configuration of the slidably cooperating surfaces of these two members.

Since the adjustment screw 7 is easy to get at the braking force applied by the friction member on the socket 2 may be adjusted at will, thus permitting the desired adjustment of the effort necessary for rotating the pivot pin 11 without interfering with the screw plug 3 which is concealed and not accessible on the device subsequent to the mounting thereof, this screw plug obviously having no adjustment means.

It will be readily understood that the shape of the body 1 may be modified according to the position, direction and relative dimensions of the pivot pin to be braked and held against motion.

If desired, the case in which the adjustment screw 7 consisted of the screw-plug 3 proper may be contemplated; in this case the body 1 must be so designed as to permit the insertion of the elastic pad 5 into it from the upper face, the screw 7 having a corresponding diameter, as shown by way of example in FIGURE 7.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A device for mounting on a frame structure the end of a pivot pin solid with a member to be rotated in relation to said structure, which comprises a body provided with a flange for securing the device to said frame structure, a recess formed in said body under said flange and leading to the outside by means of two apertures formed through said flange, one of said apertures having a plain cylindrical wall adapted to receive the pivot pin, the second aperture being internally screw-threaded, a friction member slidably mounted in said recess and having a part-cylindrical concave face engaging said pivot pin, an elastomer pad, means confining said pad in said recess in resilient engagement with said friction member and adapted to urge said concave face of said friction member against the end of said pivot pin, and a screw engaging said tapped second aperture and adapted to be rotated from the outside of said flange for adjusting the pressure exerted by said elastomer pad against said friction member.

2. A device as set forth in claim 1, wherein the end of said pivot pin comprises a non-circular end portion and a socket having a cylindrical outer wall rotatably engaged in the cylindrical aperture formed through said flange and an internal wall having the same non-circular cross-section as said end portion of the pivot pin engaged in said socket.

3. A device as set forth in claim 1, wherein the diameter of said tapped second aperture formed through said flange is sufficient to permit the mounting of said elastomer pad in said recess through said second aperture from the outer face of said flange before engaging said screw.

4. A device as set forth in claim 2, in which said tapped second aperture extending through said flange has a cross-sectional dimension smaller than that of said pad and in which a third aperture in said body opens from said recess to the outside beneath said flange and is tapped with a diameter permitting the insertion of said pad in said recess through said third aperture beneath said flange, and a second screw is engaged in said tapped third aperture for locking said pad against said friction member and against the screw engaging said tapped second aperture.

References Cited
UNITED STATES PATENTS

| | | | |
|---|---|---|---|
| 3,235,902 | 2/1966 | Meyer | 16—140 |
| 3,237,976 | 3/1966 | Campoli | 151—24 |
| 3,239,874 | 3/1966 | Sperzel | 16—140 |

BOBBY R. GAY, *Primary Examiner.*

EDWARD C. ALLEN, *Examiner.*

D. L. TROUTMAN, *Assistant Examiner.*